United States Patent
Le et al.

(10) Patent No.: US 7,461,794 B2
(45) Date of Patent: Dec. 9, 2008

(54) SUBSTRATE TEMPERATURE REGULATING SUPPORT PINS

(75) Inventors: Hien-Minh Huu Le, San Jose, CA (US); Michael T. Starr, San Jose, CA (US)

(73) Assignee: Applied Materials, Inc., Santa Clara, CA (US)

(*) Notice: Subject to any disclaimer, the term of this patent is extended or adjusted under 35 U.S.C. 154(b) by 519 days.

(21) Appl. No.: 11/206,650

(22) Filed: Aug. 18, 2005

(65) Prior Publication Data

US 2007/0040041 A1    Feb. 22, 2007

(51) Int. Cl.
*G05D 23/12* (2006.01)
*F25D 23/12* (2006.01)
*C23C 16/00* (2006.01)

(52) U.S. Cl. .................. 236/1 C; 62/259.2; 118/724; 118/725

(58) Field of Classification Search ........... 118/724, 118/725, 728; 392/418; 700/121, 112; 236/1 C; 62/259.2
See application file for complete search history.

(56) References Cited

U.S. PATENT DOCUMENTS 5,751,003 A    5/1998  Rose et al.
6,143,086 A  * 11/2000  Tepman ............... 118/728
2004/0073328 A1 *  4/2004  De Haas et al. ......... 700/121
2005/0095088 A1    5/2005  Kurita et al.

FOREIGN PATENT DOCUMENTS

JP    2000088701 A  *  3/2000

* cited by examiner

*Primary Examiner*—Chen-Wen Jiang
(74) *Attorney, Agent, or Firm*—Patterson & Sheridan LLP

(57) ABSTRACT

A method and apparatus for regulating the temperature of substrates positioned within a chamber are provided. In one embodiment, a substrate support pin is provided that includes a body having a substrate support region defined at a first end and a mounting region defined at a second end of the body. A mounting feature is formed at the mounting region and is adapted to couple the body to a vacuum chamber body. A passage extends from the mounting region to the support region. An outlet formed through the body and orientated at an angle greater than zero relative to a centerline of the body is p provided to deliver fluids flowing through the passage out the first end of the body. In another embodiment, a chamber includes a pin configured to provide a temperature controlled fluid to an underside of a substrate supported on the pin.

26 Claims, 6 Drawing Sheets

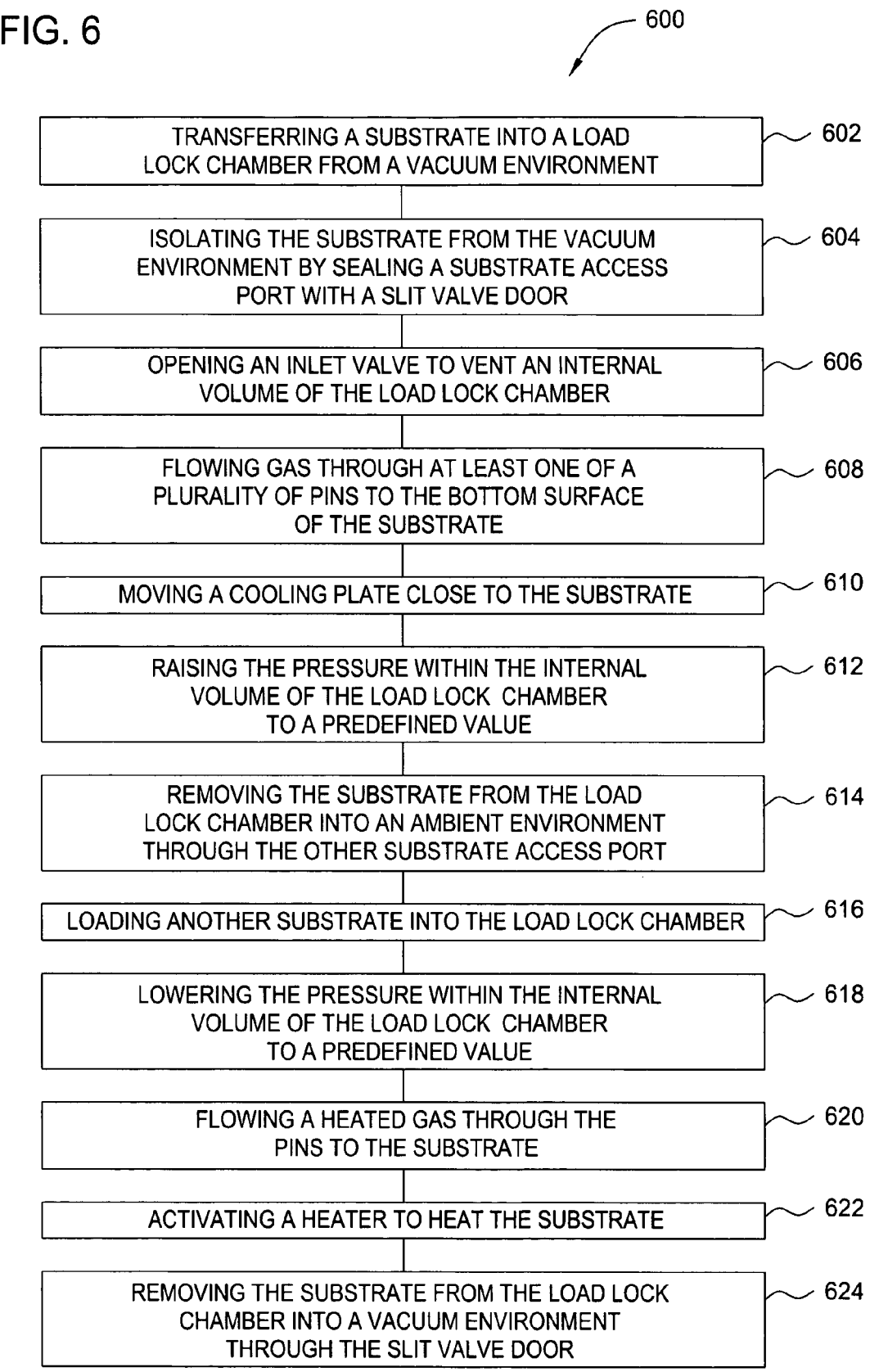

SUBSTRATE TEMPERATURE REGULATING SUPPORT PINS

BACKGROUND OF THE INVENTION

1. Field of the Invention

Embodiments of the invention generally relate to a temperature regulating substrate support pin and methods of using the same.

2. Description of the Related Art

Thin film transistors (TFT) formed by flat panel technology are commonly used for active matrix displays such as computer and television monitors, cell phone displays, personal digital assistants (PDAs), and an increasing number of other devices. Generally, flat panels comprise two glass plates having a layer of liquid crystal materials sandwiched therebetween. At least one of the glass plates includes one conductive film disposed thereon that is coupled to a power source. Power, supplied to the conductive film from the power source, changes the orientation of the crystal material, creating a pattern display.

With the marketplace's acceptance of flat panel technology, the demand for larger displays, increased production and lower manufacturing costs have driven equipment manufacturers to develop new systems that accommodate larger size glass substrates for flat panel display fabricators. Current glass processing equipment is generally configured to accommodate substrates slightly greater than about one square meter. Processing equipment configured to accommodate larger substrate sizes is envisioned in the immediate future.

Equipment to fabricate such large substrates represents a substantial investment to flat panel display fabricators. Conventional systems require large and expensive hardware. In order to offset this investment, high substrate throughput is very desirable.

Heating and/or cooling of the substrate within the load lock chamber is important to achieving high system throughput. As future processing systems are envisioned to process even larger size substrates, the need for uniform rapid heating and cooling of large area substrates is of great concern. As such, advancements which promote temperature regulation and high heat transfer rates are highly desirable.

Thus, there is a need for an improved method and apparatus that facilitates rapid and uniform heating and cooling of larger area substrates.

SUMMARY OF THE INVENTION

A method and apparatus for regulating the temperature of a substrate supported a chamber are provided. In one embodiment, a substrate support pin is provided that includes a body having a substrate support region defined at a first end and a mounting region defined at a second end. A mounting feature is disposed at the mounting region and is adapted to couple the body to a vacuum chamber body. A passage extends from the mounting region to the support region. An outlet, formed through the body and orientated at an angle greater than zero relative to a centerline of the body, is provided to deliver fluids flowing through the passage out the first end of the body.

In another embodiment, a chamber is configured to provide a temperature controlled fluid through a pin to an underside of a substrate supported on the pin. For example, substrate chamber is provided that includes a chamber body having a substrate support disposed therein. A plurality of support pins are disposed in the chamber body and are arranged to selectively separate a substrate from the substrate support. A fluid delivery passage is formed through a least one of the support pins and is adapted to provide a temperature controlled fluid to the underside of a substrate disposed on the support. In one embodiment, the chamber is a load lock chamber.

In yet another embodiment, a method for controlling temperature of a substrate is provided. The method includes the steps of supporting a substrate in a vacuum environment on a plurality of pins, and delivering a fluid to a surface of the substrate through at least one of the pins.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 6 is one embodiment of a method for regulating temperature of a substrate To facilitate understanding, identical reference numerals have been used, wherever possible, to designate identical elements that are common to the figures. It is contemplated that elements of one embodiment may be advantageously utilized in other embodiments without further recitation.

DETAILED DESCRIPTION

Embodiments of the invention generally relate to a temperature regulating substrate support pin. The pin is hollow and provides a flow path for directing a fluid to a surface of a workpiece, such as a substrate. Although embodiments of the pin are described below with reference use in a load lock chamber, the pin may find utility in other applications, including semiconductor vacuum processing chambers, where delivery of a fluid for regulating a temperature of a workpiece supported by the pin is desirable.

Figure 1:
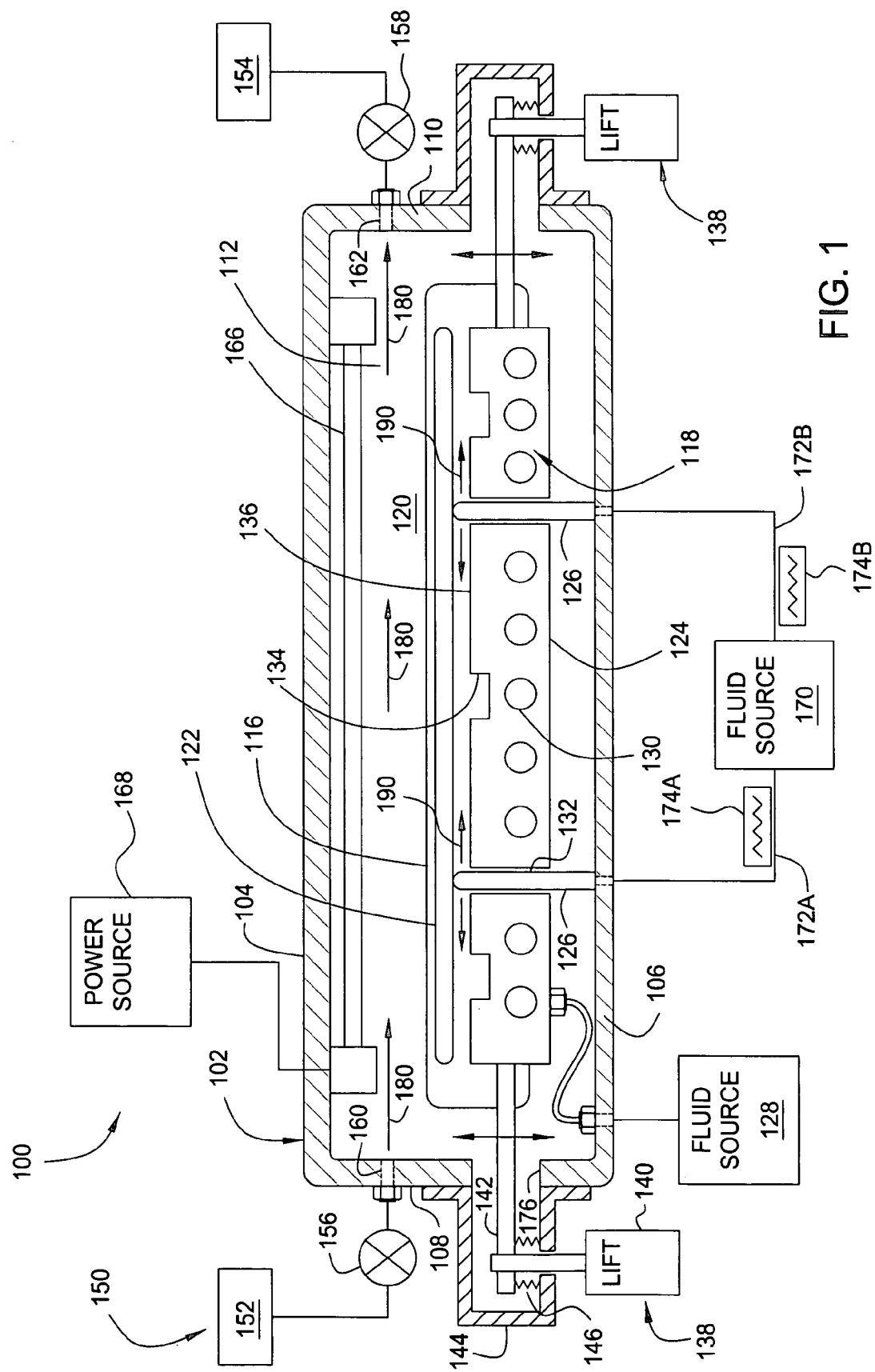
FIG. 1 is a sectional view of one embodiment of load lock chamber having at least one temperature regulating pin.

FIG. 1 depicts a cross sectional view one embodiment of a load lock chamber 100 having at least one temperature regulating pin 126 of the present invention. The load lock chamber 100 includes a body 102 fabricated from a rigid material such as stainless steel, aluminum or other suitable material. The body 102 may be fabricated from a single piece of material, or an assembly of components fabricated into a leak-free structure. The body 102 includes a top 104, a bottom 106, and sidewalls 108, 110 and 112. A fourth sidewall, which is positioned opposite the first sidewall 112, is not illustrated in FIG. 1.

At least one substrate access port 116 is disclosed in two of the sidewalls to allow entry and egress of substrates from an internal volume 120 of the chamber body 102. One port 116 is shown FIG. 1 formed through the first sidewall 112, while the second port is formed through the fourth sidewall not shown. The substrate access ports 116 are selectively sealed by slit valves, which are well known in the art. One slit valve that may be adapted to benefit from the invention is described in U.S. patent application Ser. No. 10/867,100, entitled CURVED SLIT VALVE DOOR, filed Jun. 14, 2004 by Tanase, et al., and is incorporated by reference in its entirety.

A substrate support structure 118 is disposed in the internal volume 120 defined by the body 102. The substrate support structure 118 generally is configured to support one or more substrates 122 being transferred between an ambient and a vacuum environment separated by the load lock chamber 100. Although the substrate support structure 118 depicted in FIG. 1 is illustrated supporting a single substrate 122, it is contemplated that other substrate support structures to hold one or more substrates may also benefit from the invention.

Figure 2A:
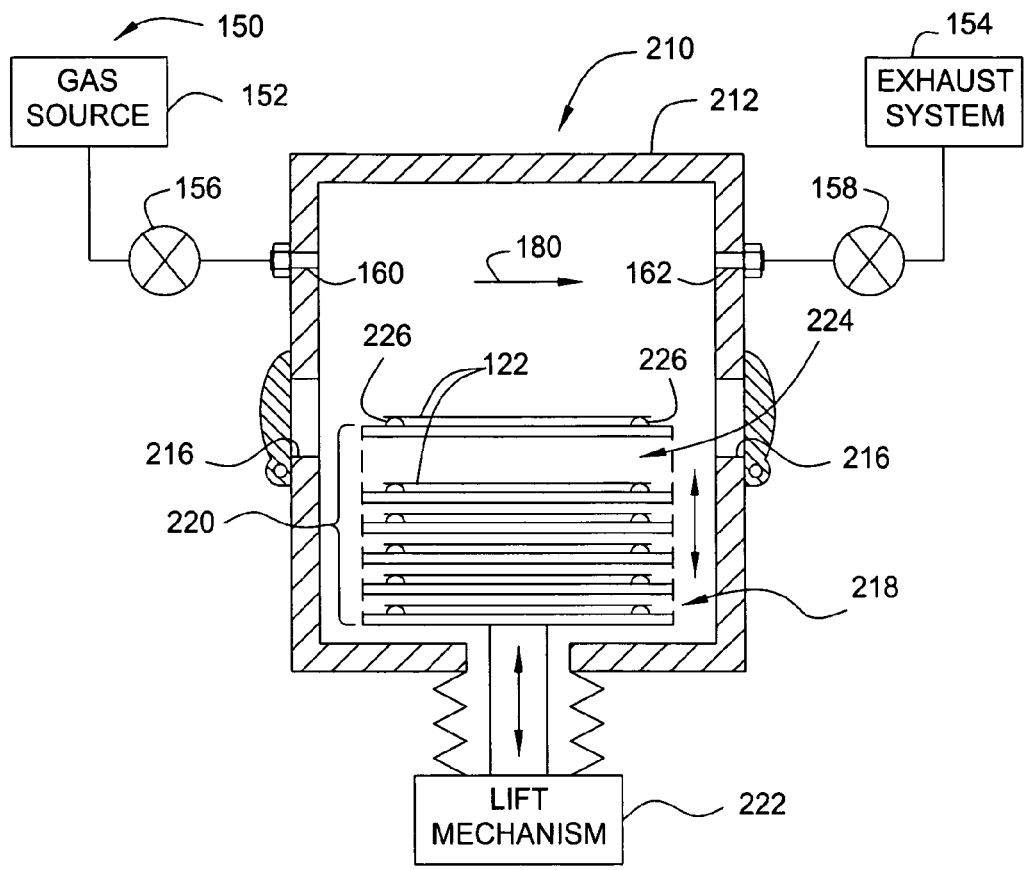
FIGS. 2A-B are side sectional views of alternative embodiments of a load lock chamber having at least one temperature regulating pin of the present invention.

For example, as depicted in FIG. 2A, a load lock chamber 210 includes a substrate support structure 218 in the form of a cassette 220. The cassette 220 includes a plurality of substrate support slots 224, each configured to retain a single substrate 122 therein. A plurality of temperature regulating pins 226 are disposed in each slot 224 to support the substrate thereon. The pins 226 are generally configured similar to the pins 126 described below with reference to the embodiment of FIG. 1. The cassette 220 is typically coupled to a lift mechanism 222 that selectively positions one of the substrates disposed in a predetermined slot 224 of the cassette 220 in alignment with the substrate access ports 216 formed in a body 212 of the load lock chamber 210. One load lock chamber having a cassette disclosed therein which may be adapted to benefit from the invention is described in U.S. Pat. No. 5,607,009, issued Mar. 4, 1997 to Turner et al., and is incorporated by reference in its entirety.

Figure 2B:
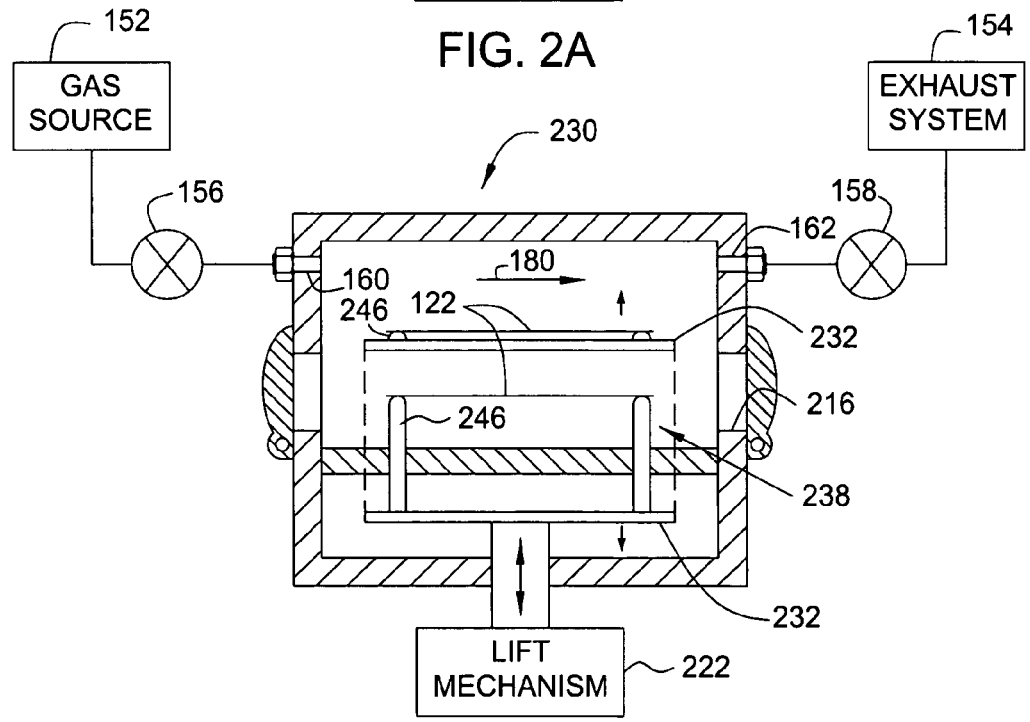

In a second example depicted in FIG. 2B, a load lock chamber 230 includes a substrate support structure 238 having multiple substrate support plates 232. Each substrate support plate 232 is configured to support a single substrate 122 thereon. A plurality of temperature regulating pins 246 extend upwards from the substrate support plate 232 into the adjacent slot 224 to support the substrate thereon. The pins 246 are generally configured similar to the pins 126 described below with reference to the embodiment of FIG. 1. The substrate support structure 238 may be configured with an optional lift mechanism 222 to align a selected substrate 122 with a substrate access port 216. Alternatively, the substrate support structure 238 may be fixed within the chamber 230, requiring a robot making the wafer exchange to provide the vertical motion necessary to lift the substrate off the support plate 232. One load lock chamber which may be adapted to benefit from the invention having similar substrate support structure is described in U.S. Pat. Ser. No. 09/957,784, entitled DOUBLE DUAL SLOT LOAD LOCK FOR PROCESS EQUIPMENT, filed Sep. 21, 2001 by Kurita et al., and is incorporated by reference in its entirety. It is contemplated that load lock chambers of other configurations may also benefit from the invention.

Returning to the embodiment depicted in FIG. 1, the substrate support structure 118 includes a plate 124 and a plurality of temperature regulating pins 126. The plate 124 is typically fabricated from aluminum or other suitable material. The pins 126 are coupled to the bottom 106 of the body 102, and extend through holes 132 formed in the body in the plate 124.

The pins 126 are configured to deliver a fluid from a fluid source 170 to the bottom of the substrate 122. The fluid source 170 provides a temperature controlled fluid through the pins 126 such that the substrate 122 may be heated and/or cooled as desired. In the embodiment depicted in FIG. 1, fluid lines 172A, 172B are coupled to different pins 126 such that the rate and/or volume of fluid provided through each pin 126 may be independently controlled. For example, the flow of fluid from the source 170 may be zero through fluid line 172A while the flow through fluid 172B is greater than zero. In another embodiment, the fluid through the fluid line 172A may be greater than the flow through fluid line 172B. In this manner, the rate of heat transfer at different regions of the substrate 122 may be tailor to obtain or maintain a desired temperature profile. It is also contemplated that the two or more, or all of the pins 126 may be coupled in series or parallel, and supplied through a commonly control mechanism.

In another embodiment, one or more of the fluid lines 172A, 172B may interface with a temperature regulating device such that the fluid flowing through the pins 126 may be heated and/or cooled. The temperature regulating device may be positioned inside or outside of the fluid source 170. In the embodiment depicted in FIG. 1, each fluid line 172A, 172B is interfaced with a respective heater 174A, 174B such that the temperature of the fluid flowing through each line may be independently controlled. By providing a cooler fluid to hotter regions of the substrate 122, temperature uniformity is promoted. It is contemplated that two or more, or all of the fluid line may be interfaced with a common temperature regulating device. Examples of fluids provided through the pins include, but are not limited to, air, helium, nitrogen, combinations thereof or other suitable gas.

Figure 3:
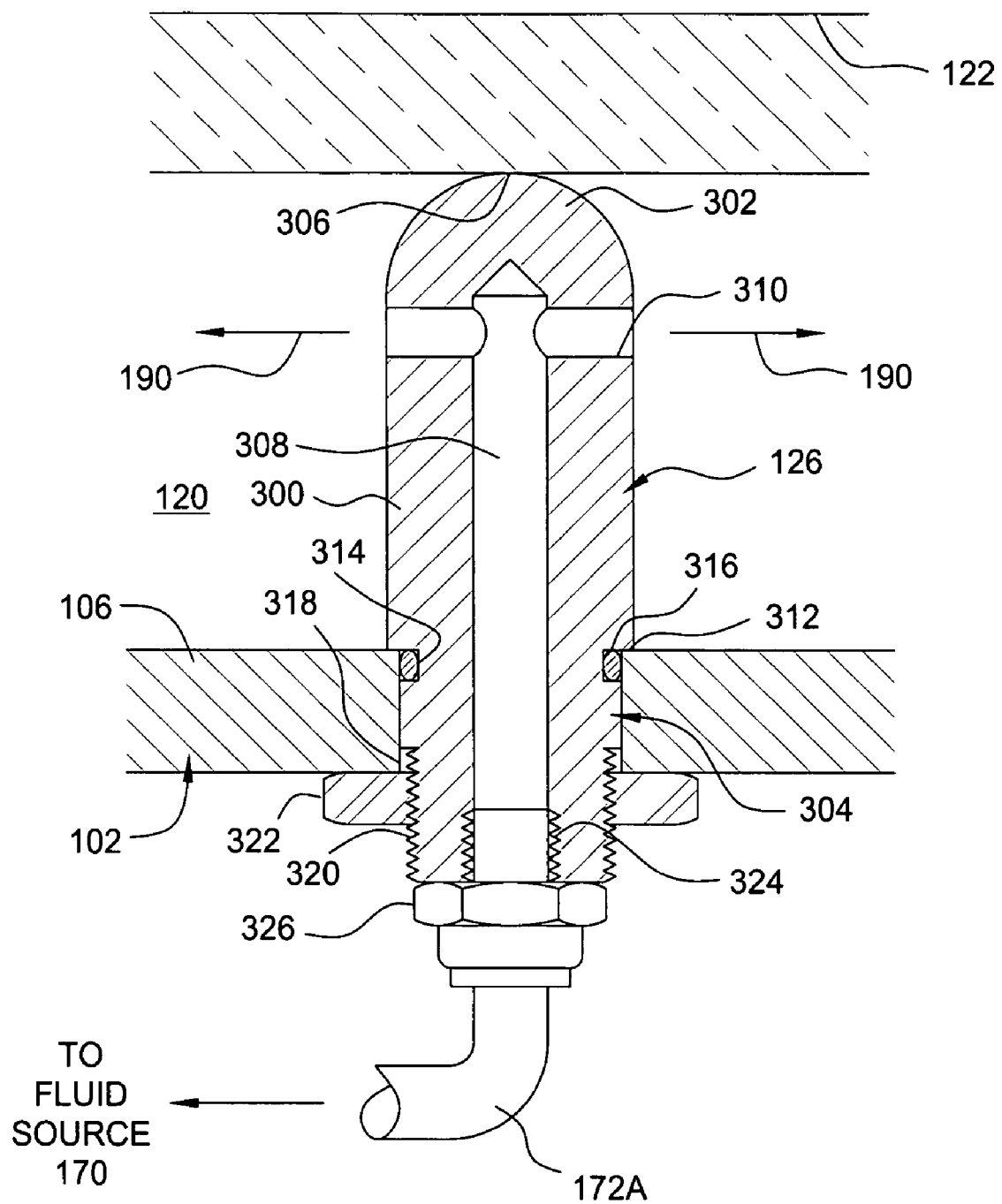
FIG. 3 is a sectional view of one embodiment of the temperature regulating pin of FIG. 1.

FIG. 3 is one embodiment of the temperature-regulating pin 126. The pin 126 includes a body 300 having a support end 302 and a mounting end 304. The support end 302 includes a support surface 306 for supporting the substrate 122 thereon.

The mounting end 304 is disposed opposite the support end 302 and extends through a hole 318 formed through the bottom 106 of the chamber body 102. The mounting end 304 is configured to couple the pin 126 to the bottom 106 of the chamber body 102, and to provide an inlet for fluids entering the pin 126 from the fluid source 170.

In one embodiment, the mounting end 304 has a diameter smaller than the portion of the pin 126 extending in to the chamber body 102. The change in diameter of the body 300 defines a land 312. The land 312 is configured to abut the interior surface of the bottom 106 such that the pin 126 is maintained in a predefined orientation extending from the bottom 106 into the interior volume 120 of the chamber body 102. An o-ring groove 314 is formed in the mounting portion 304. The groove 314 accommodates a seal 316, such as an o-ring, that prevents leakage between the chamber body 102 and the pin 126.

A distal end of the mounting portion 304 includes a threaded section 320. The threaded section 320 extends beyond the exterior surface of the bottom 106 of the chamber body 102 such that a nut 322 may be engaged therewith. The nut 322 may be tightened to pull the land 312 against the interior surface of the bottom 106, thereby securing the pin 126 to the chamber body 102.

A passage 308 is formed through the pin 126 to deliver fluid from the fluid source 170 to the undersurface of the substrate 122, as shown by flow arrows 190. In the embodiment depicted in FIG. 3, the passage 308 is a concentric hole extending from the mounting end 304 and terminating within the body 300 without extending through the support end 302. An outlet 310 is formed through the body 300 to allow fluid flowing through the passage 308 to exit the pin 126 into the internal volume 120 of the body 102. In one embodiment, the outlet 310 is a cross hole having an orientation substantially perpendicular to the plane of the substrate 122 and substantially perpendicular to the centerline of the body 300. In another embodiment, the cross hole or outlet 310 may be orientated between 45 to about 135 degrees relative to the centerline of the body 300. It is contemplated that one or more outlets may be coupled to the passage 308. It is further contemplated that the angular orientation of the outlets 310 may be configured to direct a portion of the flow 190 toward or away from the substrate 122.

The passage 308 includes a threaded portion 324 in the mounting end 304. A fitting 326 is engaged with the threaded portion 324 to facilitate coupling the supply line 172A to the fluid source 170.

FIGS. 4A through 4D depict alternative embodiments of a temperature-regulating pin. In the embodiment depicted in FIG. 4A, a temperature-regulating pin 400A includes a body 402 having a cap 404 retaining a ball 406 thereto. The ball 406 is configured to support the substrate 122 (not shown) thereon such that movement of the substrate relative to the support pin 400A minimizes the potential of scratching. A passage 408 is disposed through the body 402 to allow fluid from the fluid source 170 to enter the region of the cap 404 enclosing the ball 406. One or more outlet ports 410 are provided through the cap 404 to allow a flow 190 of fluid to enter the interior volume 120 of the chamber body 102, and thus, regulate the temperature of the substrate. The ball 406 may be coated, plated, or electropolished as described below with reference to FIG. 4B.

Figure 4A:
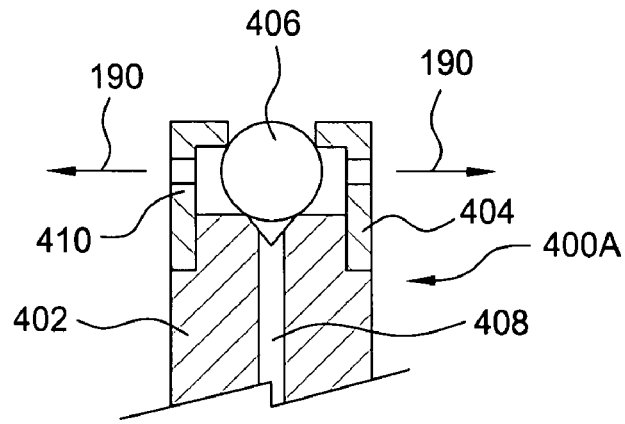
FIGS. 4A-C are sectional side and perspective views of three alternative embodiments of a temperature regulating pin.
Figure 4B:
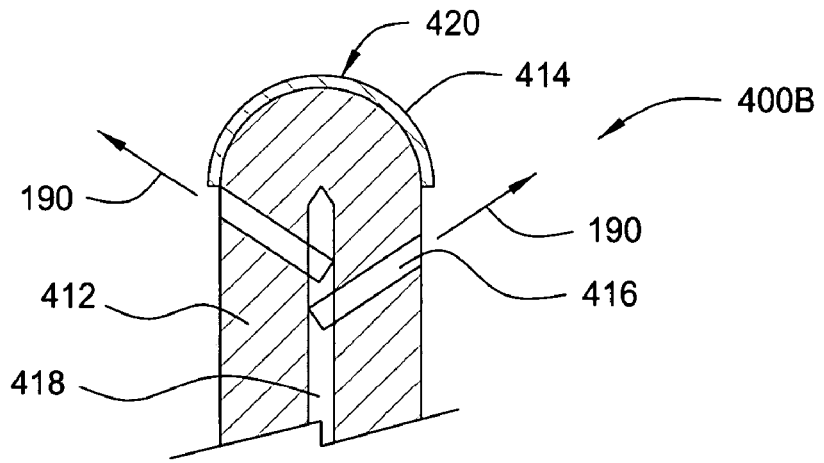

In the embodiment depicted in FIG. 4B, a pin 400B includes a body 412 having a coating 414 comprising the substrate support surface 420 of the pin 400B. The coating 414 may have a sufficient thickness to provide a barrier layer that reduces friction between the substrate support surface 420 of the pin 400B and the substrate disposed thereon. The reduced friction between the substrate and the pin 400B substantially prevents damage to the substrate caused by rubbing, vibration, thermal expansion, or other contact between the substrate and the substrate support surface 420 of the pin 400B. The coating 414 may additionally or alternatively provide reduced chemical reactions between materials comprising the support surface 420 and the substrate.

The coating 414 is generally capable of reducing or eliminating friction between the pin 400B and the substrate may be deposited by means of chemical vapor deposition (CVD) nitration processes, physical vapor deposition (PVD) sputtering processes, spraying, plating or other processes. In one embodiment, the coating 414 has a thickness of at least about 4 microns. In another embodiment, the coating 414 is formed to a thickness from between about 3 microns to about 20 microns. In another example, the pin 400B may be placed in a reaction chamber and exposed to an atmosphere comprising ammonia, and/or nitrogen, and/or hydrogen, and/or other reducing gasses to form a nitration coating layer upon the exposed surfaces of the pin 400B. In another embodiment, the coating 414 is formed by a sputtering process such as PVD to form a nitrated surface on the outer surface of the pin 400B and comprises, for example, titanium nitride.

The surface coating 414 generally provides a smooth outer surface to the substrate support surface 420 of the pin 400B. It is believed that the alternate embodiments described above of the surface coating 414 maintain a smooth surface at least as smooth as the original finish of the substrate support surface 420. Alternatively, the coating 414 may be processed, for example by electropolishing or other methods, to improve the finish of the coating 414.

A passage 418 is disclosed through the body 412 to deliver fluid to the interior volume 120 of the chamber body 102. Outlets 416 are configured such that the flow 190 of fluid exiting the pin 400B is directed at an acute angle toward the substrate 122 (not shown), disposed on the support surface 420.

Figure 4C:
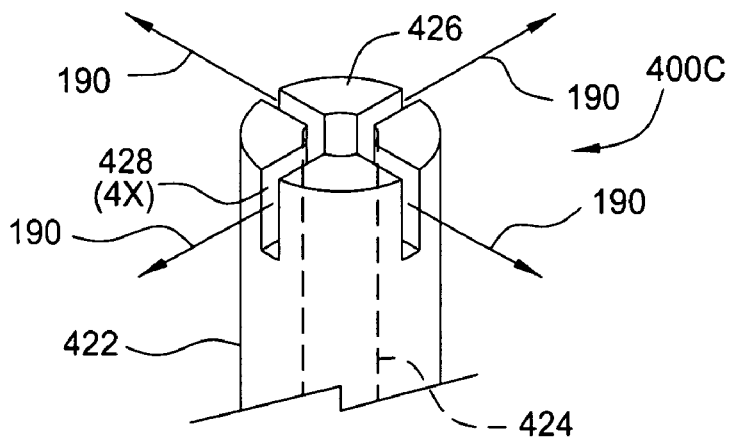

FIG. 4C depicts another embodiment of a support pin 400C. The pin 400C includes a body 422 having a passage 424 (shown in phantom) formed there through for delivering fluid from the fluid source 170 into the interior volume 120 of the chamber body 102. In the embodiment depicted in FIG. 4C, the substrate support surface 426 is substantially flat. However, it is contemplated that the substrate support surface 426 may be rounded or include another geometric shape. At least one outlet 428 is formed through the substrate support surface 426 to allow flow 196 to enter the interior volume of the processing of the chamber body 102. In the embodiment depicted in FIG. 4C, the outlet 428 is shown as four slots passing through the passage 124. As the sectional area of these slots (outlets 428) is greater than the sectional area of the passage 424, the flow 190 is substantially directed through the outlets 428 when the substrate 122 is disposed on the support surface 426 without substantially lifting the substrate 122 off of the pin 300C.

Other substrate supports pins that may be adapted to benefit from the invention are described in U.S. Pat. No. 6,528, 767, filed Mar. 11, 2003; U.S. patent application Ser. No. 09/982,406, filed Oct. 17, 2001; and U.S. patent application Ser. No. 10/376,857, filed Feb. 27, 2003, all of which are incorporated by reference in their entireties.

Returning to FIG. 1, a lift mechanism 138 is provided to control the elevation of the plate 124 within the internal volume 120 of the load lock chamber 100. In a lower position, the distal end of the pins 126 extend beyond an upper surface 136 of the plate 124, thereby supporting the substrate 122 in a spaced-apart relation relative to the plate 124. The lift mechanism 138 may selectively raise the plate 124 to an upper position such that the distal end of the pins 126 are recessed below the upper surface 136 of the plate 124, thereby causing the substrate 122 to be supported on the upper surface of the plate 124.

In one embodiment, the lift mechanism 138 generally includes an actuator 140 coupled to the plate 124 by a bar 142. The actuator 140 may be a pneumatic cylinder, a ball screw or other actuator suitable for controlling the elevation of the substrate support structure 118. The bar 142 generally extends from the plate 124 through an aperture 176 formed in the sidewall of the body 102. A portion of the bar 142 disclosed outside the body 102 is enclosed by a housing 144.

In one embodiment, a portion of the actuator 140 extends through the housing 144 and is coupled to the bar 142. A bellows or other suitable seal is engaged between the housing 144 and at least one of the actuator 140 or the bar 142 to prevent leakage through the aperture 176 and to maintain the leak-tight integrity of the load lock chamber 100.

In one embodiment, the substrate support structure 118 may be configured as a temperature regulating plate 124. The temperature regulating plate 124 is adapted to control the temperature of the substrate 122 positioned thereon or proximate thereto. For example, the plate 124 may include a plurality of passages 130 coupled to a fluid source 128. The fluid source 128 provides a heat transfer fluid that is circulated through the passages 130 to heat (or cool) the substrate 122. To maximize heat transfer between the plate 124 and the substrate 122, the plate 124 may be elevated to support the substrate 122 directly thereon (i.e., with the pins 126 retracted below upper surface 136 of the plate 124 as described above).

The upper surface 136 of the plate 124 may include one or more slots 134. The slots 134 are configured to provide channels that provide clearance for an end effector of a robot (not shown) that is positioned under the substrate 122 during substrate handoff with the substrate support structure 118.

The load lock chamber 100 may additionally include a temperature regulating plate 166 coupled to the top 104 of the body 102. In one embodiment, the temperature regulating plate 166 may be a resistive heater coupled to a power source 168. It is contemplated that the temperature regulating plate 166 may have other configurations, such as a heat lamp or a fluid conduit, among others.

A pressure control system 150 is coupled to the load lock chamber 100 to control the pressure within the internal volume 120 of the body 102. The pressure control system 150 generally includes a gas source 152 and an exhaust system 154. The gas source 152 is coupled to at least one inlet port 160 formed through the chamber body 102. The gas source 152 provides a vent gas utilized to raise and/or regulate pressure within the internal volume 120 of the chamber body 102. For example, the gas source 152 may flow vent gas into the internal volume 120 to facilitate transfer of the substrate 122 from a vacuum environment to an ambient environment. In one embodiment, the vent gas comprises at least one of nitrogen, helium, air or other suitable gas.

An inlet control valve 156 is disposed between the gas source 152 and the inlet port 160 to selectively control the flow of vent gases into the internal volume 120 of the body 102. The inlet control valve 156 is capable of providing a substantially leak-tight seal under vacuum conditions. In one embodiment, the gas source 152 is configured to control the attributes of the vent gas, such as the flow rate, temperature and/or humidity of the vent gas.

The exhaust system 154 is generally coupled to at least one exhaust port 162 formed through the chamber body 102. The exhaust system 154 is configured to remove gases from the internal volume 120 of the load lock chamber 100. The exhaust system 154 may include one or more vacuum pumps (not shown) and may be ultimately coupled to the facilities exhaust system (also not shown). For example, the exhaust system 154 may pump out gas from the internal volume 120 to facilitate transfer of the substrate 122 from an ambient environment to a vacuum environment.

An exhaust control valve 158 is disposed between the exhaust system 154 and the exhaust port 162 to selectively control the flow of gases exiting the internal volume 120 of the body 102. The exhaust control valve 158 is typically similar to the inlet control valve 156 and is capable of providing a substantially leak-tight seal under vacuum conditions.

In the embodiment depicted in FIG. 1, the exhaust port 162 and inlet port 160 are shown formed through opposing sidewalls 110, 108. Thus, when venting the internal volume 120, and/or during cooling of the substrate 122, a flow of vent gases (as represented by flow arrows 180) may be established across the surface of the substrate 122. The flow 180 is generally parallel to the plane of the substrate 122 and flows from one side to an opposite side of the substrate. The flow 180 generally increases the heat transfer rate between the substrate 122 and vent gases, advantageously increasing the cooling rate of the substrate. Moreover, by removing the vent gases during venting of the chamber, the vent gases heated by the substrate may be removed from the internal volume 120 of the load lock chamber 100 and replaced with cooler vent gases, thereby increasing the cooling rate of the substrate by substantially maintaining the temperature differential between the vent gas and substrate.

Figure 5:
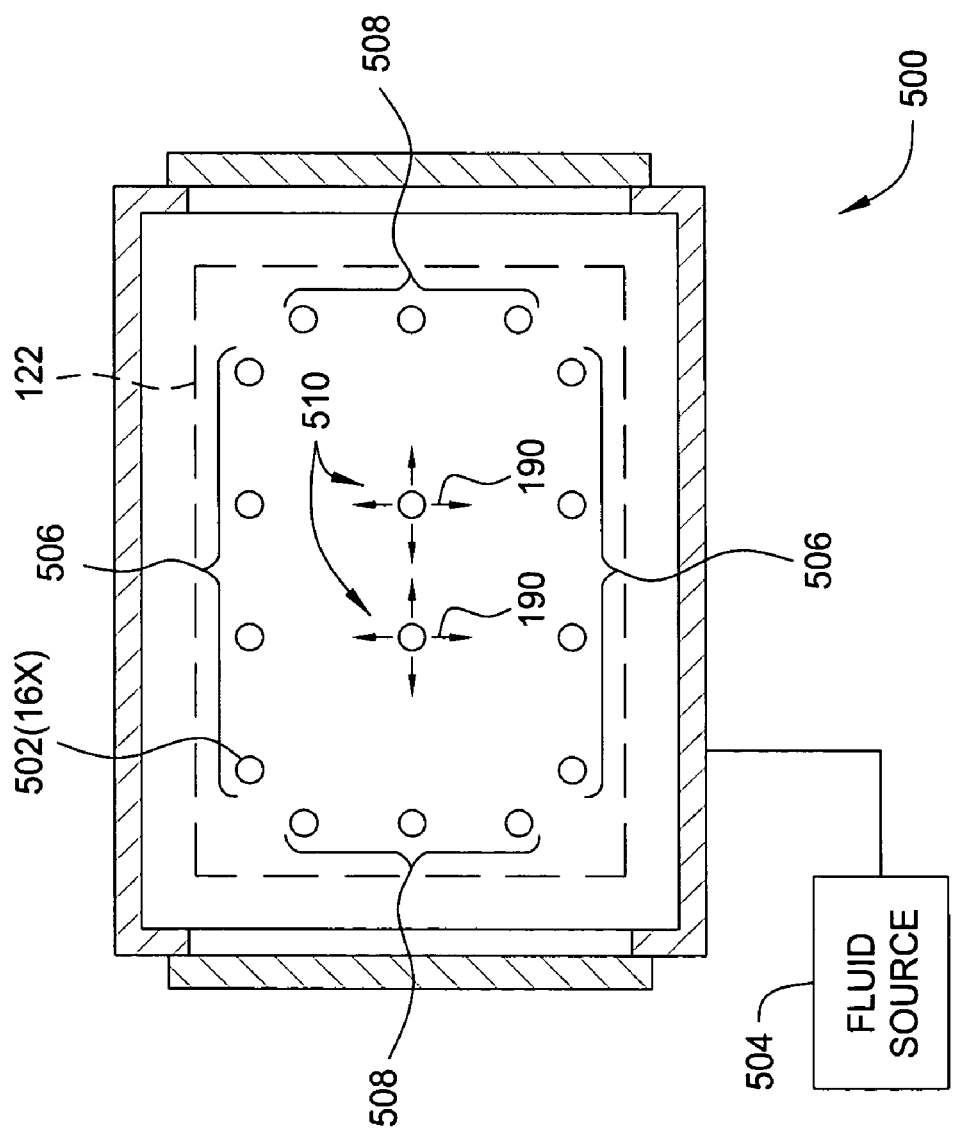
FIG. 5 is another embodiment of a load lock chamber having a plurality of temperature regulating pin.

FIG. 5 is a schematic plan view of one embodiment of a load lock chamber 500 illustrating how the pins 502 may be utilized to control the temperature of a substrate 122 (shown in phantom). Each pin 502 is fabricated similar to the pins 126 described above and is coupled to a fluid source 504. Flow arrows 190 are shown exiting only two of the pins 502, and have been omitted elsewhere for sake of clarity. An attribute (i.e., temperature, pressure, volume or rate) of fluid passing through each pin 502 may be independently regulated, or in another embodiment, controlled in groups of pins 502. For example, first groups 506 of pins 502 disposed along a long or major edge of the substrate may flow fluid to the substrate at a temperature less than a temperature of fluid delivered to the substrate from a second groups 508 of pins 502 disposed along a short or minor edge of the substrate. Similarly, a third group 510 of pins 502 disposed at the center of the substrate may deliver fluid at a temperature different than the temperature of the fluid provided to the second groups 508 of pins 502. In one embodiment, the temperature of fluid provided to the first groups 506 of pins is greater than the temperature of fluid provided to the second groups 508 of pins, while the temperature of fluid provided to the second groups 508 of pins is greater than the temperature of fluid provided to the third group 510 of pins. The different attributes of the fluids flowing through different pins allows the temperature profile of the substrate to be uniformly controlled, in the above example, cooled by compensating for the propensity of the substrate to cool fastest along the major edges and cool slowest at the substrate's center.

FIG. 6 is a flow diagram of one embodiment of a method 600 for regulating the temperature of a substrate. The method 600 begins at step 602 by transferring a substrate 122 into the load lock chamber 100 from a vacuum environment, for example, from a transfer chamber of a cluster tool. At step 604, the substrate is isolated from the vacuum environment by sealing the substrate access port 116 with a slit valve door. At step 606, the inlet valve 156 is opened to vent the internal volume 120 of the load lock chamber 100. At step 608, a flow of gas is provided through at least one of the pins 126 to the bottom surface of the substrate 122. The flow of gas across the bottom of the substrate enhances the heat transfer efficiency between the gases within the chamber and substrate, thereby cooling the substrate more rapidly and allowing the temperature profile of the substrate to be controlled. The rate, pressure, temperature or distribution of the gas delivered by the pins to the substrate may be tailored to provide a desired temperature transfer profile as discussed above with reference to FIGS. 1-5. It is contemplated that step 606 may be performed before, after or simultaneously with the performance of step 608. At step 610, the cooling plate 118 is moved in close proximity, or in contact with, the substrate 122. The combination of the cooling plate 118 and flow of gas from the pins 126 further speeds cooling of the substrate. At step 612, the pressure within the internal volume 120 of the load lock chamber 100 is raised to a predefined value. At step 614, the substrate 122 is removed from the load lock chamber 100 into an ambient environment through the other substrate access port 116. A step 616, another substrate is loaded onto the pins 126 from the ambient environment. At step 618, the chamber body is sealed and the pressure is reduced. At step 620, the substrate is heated by flowing heated gas through the pins 126 to the substrate. The rate and temperature profile of the substrate may be controlled by controlling the flow (and/or temperature) of the gas exiting the pins 126. At step 622, the heater 166 is energized, speeding the temperature rise of the substrate. At step 624, the heated substrate is transferred out of the load lock chamber 100 and into the vacuum environment for processing.

Thus, a chamber having substrate temperature control has been provided. The use of a controlled gas flow to the substrate through a support pin facilitates rapid temperature change and profile control. Used in concert with heating and/or cooling plates in a load lock chamber, substrate throughput is enhanced while the fluid exiting the pins may compensate for any undesirable temperature non-uniformity that may be caused by the heating and/or cooling plates.

While the foregoing is directed to the preferred embodiment of the present invention, other and further embodiments of the invention may be devised without departing from the basic scope thereof. The scope of the invention is determined by the claims which follow.

What is claimed is:

1. A substrate chamber, comprising:
   a chamber body;
   a substrate support disposed in the chamber body;
   a plurality of support pins disposed in the chamber body and arranged to selectively separate a substrate from the substrate support; and
   a fluid delivery passage formed through a least one of the support pins;
   wherein the pin having the passage is coupled to a bottom of the chamber body and extends through a hole in the substrate support.

2. The chamber of claim 1, wherein the fluid delivery passage further comprises:
   an outlet formed at a substrate support end of the pin and coupled at an angle to the passage.

3. The chamber of claim 2, wherein the outlet further comprises:
   at least one cross hole orientated between about 45 to about 135 degrees relative to a centerline of the pin.

4. The chamber of claim 1, wherein the pin further comprises:
   a support region adapted to support a substrate thereon; and
   a curved surface formed at the support region adapted to support a substrate thereon.

5. The chamber of claim 4, wherein the curved surface further comprises:
   a roller.

6. The chamber of claim 4, wherein the support region further comprises:
   a reduced friction coating.

7. The chamber of claim 1 further comprising:
   a fluid source coupled to the passage.

8. The chamber of claim 7, wherein the fluid source provides at least one of nitrogen, air or helium.

9. The chamber of claim 1, wherein the chamber body further comprises:
   a first substrate access port selectively sealed by a first slit valve; and
   a second substrate access port selectively sealed by a second slit valve.

10. The chamber of claim 9 further comprising:
    a heating plate disposed in the chamber body above the support pins.

11. The chamber of claim 9 further comprising:
    a cooling plate disposed in the chamber body.

12. The chamber of claim 11, wherein at least one support pin having the fluid delivery passage is disposed through a hole in the cooling plate.

13. A substrate chamber, comprising:
    a chamber body;
    a substrate support disposed in the chamber body;
    a plurality of support pins disposed in the chamber body and arranged to selectively separate a substrate from the substrate support, wherein at least one of the pins further comprises:
      a male threaded portion at a first end of the pin and engaging the chamber body; and
      a female threaded portion formed in the first end of the pin; and
    a fluid delivery passage formed through at least one of the support pins.

14. The chamber of claim 13, wherein the pin further comprises:
    a support region adapted to support a substrate thereon; and
    a curved surface formed at the support region adapted to support a substrate thereon.

15. The chamber of claim 13, wherein the fluid delivery passage further comprises:
    an outlet formed at a substrate support end of the pin and coupled at an angle to the passage.

16. The chamber of claim 15, wherein the outlet further comprises:
    at least one cross hole orientated between about 45 to about 135 degrees relative to a centerline of the pin.

17. A substrate chamber, comprising:
    a chamber body;
    a substrate support disposed in the chamber body;
    a plurality of support pins disposed in the chamber body and arranged to selectively separate a substrate from the substrate support;
    a fluid delivery passage formed through at least one of the support pins;
    a first gas delivery line coupled to a first pin of the plurality of support pins;
    a second gas delivery line coupled to a second pin of the plurality of support pins; and
    at least one temperature control mechanism configured to control temperature of fluid in the first gas delivery line independently from temperature of fluid in the second gas delivery line.

18. The chamber of claim 17, wherein the fluid delivery passage further comprises:
    an outlet formed at a substrate support end of the pin and coupled at an angle to the passage.

19. The chamber of claim 17, wherein the pin further comprises:
    a support region adapted to support a substrate thereon; and
    a curved surface formed at the support region adapted to support a substrate thereon.

20. The chamber of claim 19, wherein the curved surface further comprises:
    a roller.

21. The chamber of claim 17, wherein the chamber body further comprises:
    a first substrate access port selectively sealed by a first slit valve; and
    a second substrate access port selectively sealed by a second slit valve.

22. A method for controlling temperature of a substrate comprising:
    supporting a substrate in a vacuum environment on a plurality of pins;
    delivering a fluid to a surface of the substrate through at least one of the pins, wherein the step of delivering the fluid further comprises:
      delivering a fluid at a first temperature to the surface of the substrate through a first pin; and delivering a fluid at a second temperature to the surface of the substrate through a second pin.

23. The method of claim 22, wherein the step of delivering the fluid further comprises:
changing the temperature of the fluid passing through at least one of the pins.

24. The method of claim 22 further comprising:
venting a chamber body having the substrate disposed therein to a substantially ambient pressure while delivering the fluid through at least one of the pins.

25. The method of claim 22 further comprising:
moving a cooling plate proximate to or in contact with the substrate.

26. The method of claim 22 further comprising:
heating the substrate from a side of the substrate opposite the pins.

* * * * *